United States Patent [19]  
Milberger et al.

[11] 3,928,240  
[45] Dec. 23, 1975

[54] PROCESS FOR THE PREPARATION OF MOLYBDENUM-CONTAINING OXIDATION CATALYSTS

[75] Inventors: Ernest C. Milberger, Solon; Serge R. Dolhyj, Parma, both of Ohio

[73] Assignee: The Standard Oil Company, Cleveland, Ohio

[22] Filed: Aug. 27, 1973

[21] Appl. No.: 391,775

Related U.S. Application Data

[63] Continuation-in-part of Ser. No. 177,105, Sept. 1, 1971.

[52] U.S. Cl. ......... 252/467; 260/346.8; 260/530 N; 423/606; 252/465; 252/468; 252/470
[51] Int. Cl.$^2$ .................. B01J 23/16; B01J 23/18; B01J 23/24
[58] Field of Search ...... 252/467; 423/606; 260/467

[56] References Cited
UNITED STATES PATENTS

| | | | |
|---|---|---|---|
| 2,124,388 | 7/1938 | Weiss et al. | 252/467 |
| 2,572,300 | 10/1951 | Arnold et al. | 252/467 |
| 2,692,293 | 10/1954 | Heinemann | 252/467 |
| 2,749,366 | 6/1956 | Foster et al. | 252/467 |
| 2,765,263 | 10/1956 | Fritz et al. | 252/467 |
| 2,814,650 | 11/1957 | Clark | 252/467 |
| 2,847,358 | 8/1958 | Kemp et al. | 252/467 |
| 2,887,473 | 5/1959 | Balthis et al. | 252/467 |
| 2,990,427 | 6/1961 | Caldwell | 252/467 |
| 2,995,609 | 8/1961 | Frech et al. | 252/467 |
| 3,117,097 | 1/1964 | Janoski | 252/467 |
| 3,169,919 | 2/1965 | Gatsis et al. | 252/467 |
| 3,336,100 | 8/1967 | Cloppet | 423/606 |
| 3,351,423 | 11/1967 | Zimmerley et al. | 423/606 |
| 3,542,842 | 11/1970 | Grasselli et al. | 252/467 |
| 3,551,470 | 12/1970 | Shaw et al. | 252/467 |
| 3,574,729 | 4/1971 | Gasson | 252/467 |
| 3,595,911 | 7/1971 | Ball | 252/467 |
| 3,631,104 | 12/1971 | Habermann et al. | 252/467 |
| 3,644,509 | 2/1972 | Allen | 252/467 |
| 3,676,332 | 7/1972 | Johnson | 252/467 |

FOREIGN PATENTS OR APPLICATIONS

| | | | |
|---|---|---|---|
| 4,523,615 | 1970 | Japan | |
| 381,570 | 10/1932 | United Kingdom | 252/467 |

OTHER PUBLICATIONS

Campbell, Def. Pub. 8640.G.730, 7/5/69.
Ishii et al., Chemical Abstracts, 69(1968), No. 70183.
Suzuki et al., Chemical Abstracts, 74(1971), No. 99466.
Chemical Abstracts, p. 19683S, 8th collective index.

*Primary Examiner*—Arthur P. Demers
*Attorney, Agent, or Firm*—Herbert D. Knudsen

[57] ABSTRACT

Molybdenum containing oxidation catalysts are prepared by reducing hexavalent molybdenum to a valence state below +6 prior to or during the catalyst preparation. Reproducible catalysts with superior catalytic activity are conveniently made by this process.

9 Claims, No Drawings

PROCESS FOR THE PREPARATION OF MOLYBDENUM-CONTAINING OXIDATION CATALYSTS

CROSS REFERENCE TO RELATED APPLICATION

This application is a continuation-in-part of our prior application Ser. No. 177,105 filed Sept. 1, 1971, with Harley F. Hardman. Our prior application is hereby incorporated by reference.

BACKGROUND OF THE INVENTION

Oxidation catalysts are prepared using compounds containing hexavalent molybdenum usually in the form of molybdenum trioxide or in the form of ammonium heptamolybdate. These catalysts are normally prepared by combining the catalytic components in the desired amounts and calcining the final catalysts produced at temperatures above about 200°C.

The oxidation catalysts are then used in reactions such as the ammoxidation of olefins, the oxidation of olefins or aldehydes and the oxidation dehydrogenation of alkanes and olefins. These reactions are well known in the art and are not the subject of the present invention.

SUMMARY OF THE INVENTION

It has now been discovered in the process for the preparation of oxidation catalysts containing molybdenum using a compound containing hexavalent molybdenum, the improvement comprising partially reducing the molybdenum in the compound containing hexavalent molybdenum to a valence state below +6 with a reducing agent before or during the preparation of the catalyst. Using the present invention, catalysts of enhanced activity and selectivity and more reproducible preparations result.

The central aspect of the present invention is the reduction of the molybdenum in the compound containing hexavalent molybdenum employed in the preparation of oxidation catalysts. This lower oxidation state is stabilized and retained during subsequent catalyst preparation steps, such as calcination at temperatures above 200°C. It is the discovery of the invention that catalysts containing reduced molybdenum are superior to and easier to prepare than the catalysts of the art.

Once the thrust of the invention is known, those of ordinary skill in the art are capable of determining a number of procedures, reducing agents and degrees of reduction that would be suitable for use in the present invention. Therefore, it is not necessary to describe all possible means for accomplishing the reduction, for one of ordinary skill could accomplish the reductions with little or no experimentation.

Broadly, any conditions or reducing agent may be used so long as the basic nature of the catalyst is not adversely affected. Even though there is a large number of alternative procedures by which these catalysts can be made, procedures that have been found to be preferred will be discussed in detail below.

A preferred method of reduction involves the contact of the compound containing hexavalent molybdenum with a controlled amount of a strong reducing agent. For example, molybdenum trioxide could be contacted in an aqueous suspension with a given amount of tungsten metal powder to effect a certain and reproducible degree of reduction.

A second preferred method of preparing a catalyst containing reduced molybdenum is to heat the compound containing hexavalent molybdenum in a liquid in the presence of a weak reducing agent. For example, an aqueous suspension of antimony trioxide and molybdenum trioxide could be refluxed for a number of hours. The amount of water in such a preparation is not critical, but about 500 to about 2000 milliliters per mole of molybdenum trioxide reacted has been found to give good results.

During the reductions of the present invention, it has been observed that the water containing the hexavalent molybdenum changes color. It is believed that this change in color is an indication that the molybdenum is being reduced.

There is substantially no limit on the reducing agents that could be employed to reduce the compound containing hexavalent molybdenum. A wide range of reducing agents are known that could reduce hexavalent molybdenum. Representative examples of strong reducing agents include finely divided or colloidal metals such as molybdenum, tungsten, magnesium, aluminum or nickel stannous ion, sulfur dioxide, organic reducing agents, hydrazine hydrate and the like. Representative examples of weak reducing agents are lower valent antimony oxides and salts and other metal oxides or salts containing metals in their lower oxidation states.

The amount by which the hexavalent molybdenum is reduced may vary as different catalysts are employed. The important feature of the invention is that the hexavalent molybdenum is reduced until a significantly improved catalyst or preparation is obtained. In a preferred practice of the invention, enough reducing agent is employed so that the valence requirements of the hexavalent molybdenum is reduced by about 0.2 to about 20%. When powdered metals, such as tungsten or molybdenum, are employed, the amount of metal preferably reacted is about 0.01 to about 10 atom percent per mole of hexavalent molybdenum present.

The catalytic components other than molybdenum are conveniently incorporated into the catalyst after the reduction step of the present invention. Alternatively, the other catalytic components are present during the reduction of the hexavalent molybdenum. The presence of other elements during the reduction is acceptable so long as these other elements do not interfere with or are not adversely affected by the reduction.

After the reduction step of the present invention and the incorporation of other required elements, the catalysts are normally calcined at a temperature between about 350° and about 650°C. into the final form of the catalyst. The reduced molybdenum is not adversely affected by these subsequent treatments.

The other aspects of the invention are not critical. The central aspect of the invention is the reduction of hexavalent molybdenum as discussed above. The following discussion, however, describes some of the other variables.

As noted, the present invention prepares oxidation catalysts containing molybdenum. The structure of the catalyst may range from a simple molybdenum oxide catalyst to a complex multicomponent catalyst. Any catalyst containing molybdenum could be prepared by the process of the invention. The preferred catalysts of the present invention are those used in the oxidation, ammoxidation and oxidative dehydrogenation of olefins, diolefins, aldehydes and aromatic compounds. Representative examples of such reactants are propylene, butylenes, butadiene, iosamylene, acrolein, methacrolein, benzene and methyl substituted benzenes. Using the catalyst preparation of the present invention, these catalysts are improved, the catalysts are conveniently reproduced and the lower oxidation state of the molybdenum is stabilized and retained during calcination procedures.

SPECIFIC EMBODIMENTS

Comparative Example A and Examples 1-11

Effect of reduced catalyst on the preparation of maleic anhydride

The effect of using a catalyst containing reduced molybdenum was examined for a catalyst of $Sb_4Mo_6O_{24}$ in the oxidation of butadiene to obtain maleic anhydride. The catalysts were prepared as follows:

Comparative Example A $Sb_4Mo_6O_{24}$ 288 grams of $MoO_3$ and 194.3 grams of $Sb_2O_3$ were ball milled for 24 hours. The mix was screened through a 200 mesh sieve and then pelleted. The pellets were calcined in air for one hour at 65°C. and then for 2½ hours at 400°C.

Examples 1 and 2

$Sb_4MO_6O_{24}$

Four separate batches each containing 143.9 grams molybdenum trioxide and 97.2 grams antimony trioxide were refluxed in 1000 mls. distilled water for 2½ hours and were evaporated and dried overnight at 120°C. The dried materials were mixed together, then ground and screened to 20/30 mesh. The resulting material was hard and olive green in color. The catalyst was calcined at aobut 425°C. for 2 hours.

Example 3

$Mo_{0.12}Sb_4Mo_6O_{24.4}$ 72 grams of $MoO_3$ and 0.95 grams of molybdenum metal powder (99.8%) were slurried in 1000 mls. of distilled water and refluxed for 2 hours. 48.6 grams of $Sb_2O_3$ were then added, and refluxing continued for an additional 2 hours. The slurry was then evaporated to a thick paste, which was then dried overnight at 110°C. The resulting dark greenish-black material was ground and screened to 20-30 mesh. The catalyst was pretreated as in Example 1.

Example 4

$Mo_{0.12}Sb_4Mo_6O_{24.4}$ 72 grams of $MoO_3$, 0.95 grams of molybdenum metal powder and 48.6 grams of $Sb_2O_3$ were slurried in 1 liter of distilled water. The slurry was refluxed for 3 hours and then evaporated to a thick paste. The catalyst was then dried overnight at 110°C. and ground and screened to 20-30 mesh. The catalyst was pre-treated as in Example 1.

Example 5

$Mo_{0.12}Sb_4Mo_6O_{24.4}$ 72 grams of $MoO_3$ and 48.6 grams $Sb_2O_3$ were slurried in one liter of distilled water. The slurry was refluxed for three hours. To this slurry was added 0.95 grams of molybdenum metal powder and refluxing was continued for one hours. The slurry was then evaporated, dried and screened to 20-30 mesh. The catalyst was pre-treated as in Example 1.

Example 6

$Mo_{0.12}Sb_4Mo_6O_{24.4}$

The procedure of Example 3 was repeated.

Example 7

$W_{0.12}Sb_4Mo_6O_{24.4}$

The same procedure of Example 3 was employed except that 1.84 grams of tungsten metal powder were used in place of the molybdenum powder.

Example 8

$Mg_{0.12}Sb_4Mo_6O_{24.1}$

The procedure of Example 3 was used except that 0.24 gram of magnesium metal powder was employed in place of the molybdenum powder.

Example 9

$Al_{0.12}Sb_4Mo_6O_{24.2}$

The procedure of Example 3 was employed except that 0.27 gram of aluminum metal powder was used in place of molybdenum powder.

Example 10

$Ni_{0.12}Sb_4Mo_6O_{24.1}$

The procedure of Example 3 was employed except that 0.59 grams of nickel metal powder was used in place of the molybdenum powder.

Example 11

$Sb_4Mo_6O_{24}$

The preparation was the same as in Example 3 except that 0.75 gram of hydrazine hydrate was used in place of the molybdenum powder.

These catalysts were tested for effectiveness in the oxidation of butadiene to maleic anhydride in a 20 cc. fixed-bed, down-flow reactor constructed of a length of one-half inch stainless steel tubing. The reactor was heated with a split stainless steel block furnace.

The primary receiver consisted of a 500 milliliter flask which functioned as an air condenser and most of the maleic anhydride was collected therein as a solid. The non-condensible gases passed through a water scrubber, and the unabsorbed gases were vented.

Product analyses of the aqueous scrubber liquid were conducted by determining total acid content by titration with standard base (0.1N sodium hydroxide) and maleic anhydride was determined by gravimetric precipitation of barium maleate. The scrubber liquid which contained carbonyl products such as acetaldehyde, furan, acrolein, methyl ethyl ketone, crotonaldehyde and acetone was analyzed by gas chromatography using a three-foot Poropak QS column in a F & M 810 Research Chromatograph. The analyses of the liquid products were conducted by comparing the response of the unknown sample with that of a standard.

The gravimetric method for analyzing maleic anhydride consisted of mixing 25 milliliters of the scrubber solution with 20 milliliters of a solution of 5% $BaCl·2·H_2O$ and adding concentrated ammonium hydroxide to obtain a phenolphthalein color reaction. The solution was then diluted to 150 milliliters with absolute alcohol. The filtered precipitate was dried at 110°C. for 2 to 3 hours, and the maleic anhydride was calculated as barium maleate monohydrate according to the method described in *J. Am. Chem. Soc.* 57, 1390, 1935.

The results of these experiments are given in Table I. The percent per pass conversion to maleic anhydride is defined as follows:

on a single pass of the starting material over the catalyst, $$\frac{\text{Grams of carbon as maleic anhydride obtained}}{\text{Grams of carbon as organic starting material fed}} \times 100$$

Table I

IMPROVEMENT RESULTING FROM USING $Sb_4Mo_6O_{24}$ CATALYSTS CONTAINING REDUCED MOLYBDENUM IN THE PREPARATION OF MALEIC ANHYDRIDE FROM BUTADIENE

| Example | Reducing Agent | Bath Temp °C | Air/BD moles | C.T., sec. | WWH | Mole % Per Pass Conversions to Total Acid | Mole % Per Pass Conversions to Maleic Anhydride |
|---|---|---|---|---|---|---|---|
| Comp. A | none | 385 | 30 | 2.2 | — | — | 47.0 |
| 1 | $Sb_2O_3$ | 371 | 27 | 3.2 | 0.024 | 58.0 | 54.5 |
| 2 | " | 399 | 26 | 3.0 | 0.025 | 58.9 | 57.3 |
| 3 | $Mo_{0.12}$ | 371 | 33 | 3.1 | 0.066 | 77.3 | 76.6 |
| 4 | " | 371 | 33 | 3.1 | 0.021 | 70.1 | 70.9 |
| 5 | " | 371 | 30 | 3.1 | 0.023 | 69.9 | 64.5 |
| 6 | " | 371 | 33 | 3.2 | 0.060 | 77.6 | 74.3 |
| 7 | $W_{0.12}$ | 371 | 26 | 3.1 | 0.061 | 74.4 | 68.9 |
| 8 | $Mg_{0.12}$ | 399 | 27 | 3.0 | 0.050 | 68.0 | 61.9 |
| 9 | $Al_{0.12}$ | 399 | 27 | 3.0 | 0.051 | 71.3 | 65.3 |
| 10 | $Ni_{0.12}$ | 399 | 30 | 3.0 | 0.042 | 63.9 | — |
| 11 | hydrazine hydrate | 371 | 22 | 3.2 | 0.068 | 73.5 | — |

Comparative Examples B-D and Examples 12–15

Preparation of Acrylic Acid

Catalysts having the formula $Mo_{12}V_3W_{1.2}O_x$ which are useful for the oxidation of acrolein to acrylic acid were prepared using an unreduced hexavalent molybdenum as compared to the reduced hexavalent molybdenum. Comparative Examples B and C and Examples 12 and 13 were prepared from the oxides whereas Comparative Example D and Examples 14 and 15 were prepared from the ammonium salts. The catalysts all had the composition 62% $Mo_{12}W_3V_{1.2}O_x$ + 38% $SiO_2$ and were prepared as follows:

Comparative Examples B and C

Unreduced Mo 72 grams of $MoO_3$, 13.37 grams of $V_2O_5$ and 12.50 grams of $H_2WO_4$ were slurried in 750 cc. of distilled water and refluxed for 2 hours. No color change was observed. 146.8 grams of Nalco silica sol (40% $SiO_2$) was added. The slurry was evaporated to a thick paste, which was then dried overnight at 110°C. The resulting dark yellow material was ground and screened to 20/30 mesh and pre-treated in a reactor under air flow for 2 hours at 399°C.

Examples 12 and 13

Reduced Mo 72 grams of $MoO_3$, 13.36 grams of $V_2O_5$ and 9.19 grams of tungsten metal powder were slurried in 735 cc. distilled water and refluxed for 2 hours. The color changed to dark blue-black. 170.4 grams of Nalco silica sol (34% $SiO_2$) was added. The slurry was evaporated to a thick blue-black paste, which was dried overnight at 110°C. The resulting dark-green material was pre-treated as in Examples B and C.

Comparative Example D

Unreduced Mo 88.6 grams of $(NH_4)_6Mo_7O_{24}\cdot4H_2O$, 13.48 grams $(NH_4)_6W_7O_{24}\cdot6H_2O$, 14.62 grams $NH_4VO_3$ and 145.5 grams of Nalco silica sol (40% $SiO_2$) were dissolved in 735 cc. distilled water and evaporated to a thick orange paste, then dried overnight at ~110°C. The resulting material was ground and screened to 20/30 mesh. The catalyst was pre-treated in a reactor under air flow by heating slowly within 3 hours from room temperature to 399°C., then keeping for approximately 4 additional hours at 399°C.

Examples 14 and 15

Reduced Mo

The catalyst was prepared in an identical manner as Comparative Example D, except 9.19 grams tungsten metal powder was used as the W source. The color of the solution changed to dark blue-black. The dried material was pre-treated in a reactor as in Example D.

Using the reactor of the examples above, the oxidation of acrolein to acrylic acid was conducted. The conditions and results of such reactions are shown in Table II.

Table II

EFFECT OF REDUCED MOLYBDENUM CATALYSTS ON THE OXIDATION OF ACROLEIN TO ACRYLIC ACID

| Example | Temp., °C. Bath | Temp., °C. Exotherm | Feed/Mole of Acrolein Air | Feed/Mole of Acrolein $H_2O$ | C.T. Sec. | Unreacted Acrolein | Molar Per Pass Conversion to Acrylic Acid |
|---|---|---|---|---|---|---|---|
| Comp. B | 260 | 265 | 10.3 | 6.2 | 2.0 | 69.0 | 24.9 |
| Comp. C | 343 | 354 | " | " | 1.7 | 7.0 | 50.3 |
| 12 | 260 | 283 | 10.2 | 6.1 | 2.0 | trace | 80.3 |
| 13 | 246 | 256 | " | " | 2.1 | 4.2 | 86.3 |
| Comp. D | 274 | 289 | 10 | 6 | 1.9 | 0.4 | 80.4 |
| 14 | 260 | 281 | 10.3 | 6.2 | 2.0 | 0.3 | 86.2 |

Table II-continued
EFFECT OF REDUCED MOLYBDENUM CATALYSTS ON THE OXIDATION OF ACROLEIN TO ACRYLIC ACID

| Example | Temp., °C. Bath | Temp., °C. Exotherm | Feed/Mole of Acrolein Air | Feed/Mole of Acrolein H$_2$O | C.T., Sec. | Unreacted Acrolein | Molar Per Pass Conversion to Acrylic Acid |
|---|---|---|---|---|---|---|---|
| 15 | 232 | 242 | '' | '' | 2.1 | 3.2 | 90.2 |

Comparative Examples E and F and Examples 15 and 16

Comparison in the Preparation of Methacrylic Acid from Methacrolein

A demonstration of the superiority of the reduced catalysts of the invention for the conversion of methacrolein to methacrylic acid using a catalyst of $Sb_2Mo_3P_{0.25}O_x$ was made. The catalyst were prepared as follows:

Comparative Examples E and F

Unreduced Mo 72 grams of MoO$_3$ was slurried in 500 ml. distilled water. 4.8 grams of 85% phosphoric acid was added, and the mixture was refluxed overnight. Color turned yellow with only a small amount of undissolved residue remaining. 48.6 grams of Sb$_2$O$_3$ was added with a resulting color change to green then to dark blue. This was refluxed for several hours, and then evaporated to a dark blue paste. The paste was dried overnight at 110°C. the dark blue material was ground and screened to 20/30 mesh. Prior to use, the catalyst was pretreated in the reactor with an air flow for 2 hours at 427°C.

Examples 15 and 16

Reduced Mo 72 grams of MoO$_3$ was slurried in 1000 ml. distilled water and 4.8 grams of 85% phosphoric acid was added. The mixture was heated to boiling. Color changed to yellow. 0.96 grams of finely powdered molybdenum metal powder was added and color changed immediately to dark blue. Boiling was continued until the volume had been reduced to 500 ml. 48.6 grams of Sb$_2$O$_3$ and the slurry was refluxed for two hours with no additional color change. The mixture was then evaporated to a thick homogenous paste and subsequently dried overnight at 110°C. The deep dark blue cake was ground and screened to 20/30 mesh. The catalyst was pre-treated in the same manner as above.

The conditions and results of these experiments in the fixed-bed reactor of the examples above are given in Table III. The feed ratio of methacrolein/air/steam was 1/8/8 for all examples.

Table III
EFFECT OF REDUCED MOLYBDENUM CATALYSTS ON THE OXIDATION OF METHACROLEIN TO METHACRYLIC ACID

| Example | Temp., °C. Bath | Temp., °C. Exotherm | C.T. Sec. | Unreacted Methacrolein | Per Pass Conversion to Methacrylic Acid |
|---|---|---|---|---|---|
| Comp. E | 371 | 377 | 4.5 | 61.5 | 17.6 |
| Comp. F | 399 | 402 | 4.3 | 54.1 | 18.4 |
| 15 | 371 | 371 | 4.5 | 63.2 | 22.2 |
| 16 | 399 | 402 | 4.3 | 44.0 | 21.5 |

We claim:

1. In the process for the preparation of oxidation catalysts containing antimony, molybdenum and oxygen or vanadium, molybdenum and oxygen or tungsten, molybdenum and oxygen, using an aqueous solution or slurry of a compound containing hexavalent molybdenum, the improvement comprising
partially reducing in the aqueous solution or slurry the molybdenum in the compound containing hexavalent molybdenum to a valence state below +6 with a reducing agent capable of reducing hexavalent molybdenum.

2. The process of claim 1 wherein the catalyst contains antimony, molybdenum and oxygen.

3. The process of claim 1 wherein the catalyst contains vanadium, tungsten, molybdenum and oxygen.

4. The process of claim 1 wherein the compound containing hexavalent molybdenum is molybdenum trioxide or ammonium heptamolybdate.

5. The process of claim 1 wherein the compound containing hexavalent molybdenum is molybdenum trioxide.

6. The process in claim 1 wherein the reducing agent is a member selected from the group consisting of finely divided metal, an organic reducing agent, hydrazine hydrate, stannous ion and sulfur dioxide.

7. The process in claim 6 wherein the finely divided metal is molybdenum.

8. The process in claim 6 wherein the finely divided metal is tungsten.

9. The process of claim 1 wherein the catalyst is prepared by refluxing an aqueous mixture of the compound containing hexavalent molybdenum and a reducing agent.

* * * * *